MODULAR TV MONITOR HOUSING AND STAND

Filed Oct. 27, 1967

INVENTOR.
Walter G. Anders
BY
Frease & Bishop
ATTORNEYS

INVENTOR.
Walter G. Anders
BY
Frease & Bishop
ATTORNEYS

MODULAR TV MONITOR HOUSING AND STAND

Filed Oct. 27, 1967

INVENTOR.
Walter G. Anders
BY
Frease & Bishop
ATTORNEYS

INVENTOR.
Walter G. Anders
BY
Frease & Bishop
ATTORNEYS

INVENTOR.
Walter G. Anders
BY
Frease & Bishop
ATTORNEYS

United States Patent Office 3,450,454
Patented June 17, 1969

3,450,454

MODULAR TV MONITOR HOUSING AND STAND

Walter G. Anders, Canton, Ohio, assignor to Diebold Incorporated, Canton, Ohio, a corporation of Ohio Filed Oct. 27, 1967, Ser. No. 678,731
Int. Cl. A47b *81/00, 77/08;* A47f *7/00*
U.S. Cl. 312—223 10 Claims

ABSTRACT OF THE DISCLOSURE

A housing and stand structure for a plurality of TV monitors of modular design so that any reasonable number of standard TV monitors may be compactly supported adjacent one another, for example, two to sixteen monitors; the modular construction permitting with the same fundamental construction of stand and housing parts and duplicating and lengthening such parts, the reception and support of different numbers of different vertical and horizontal rows of TV receivers, with each receiver contained in a drawer-like shell for quick access to the receiver for repair or replacement.

BACKGROUND OF THE INVENTION

*Field of the invention*

The invention relates to a housing rack or stand for a plurality of TV receivers and more particularly to a rack or stand for a relatively large number of receivers concentrated at one station such as the guard station at an entrance of an industrial plant, so that even a single guard may maintain plant security surveillance from television pictures transmitted to the guard station from a large number of cameras at different locations or zones in and around the industrial plant.

Television cameras and monitors are being used extensively for plant surveillance in large industrial complexes. The effective use of such equipment requires that a large number of television monitors, each energized by a different camera at a different plant location, be located at a central station such as the guard office at one of the plant gates or entrances.

The assembled group of monitors should be watched constantly by at least one guard. Where the monitors are relatively large in number, their arrangement should be concentrated so that the guard may watch all monitors at one time with the least inconvenience. At the same time, the monitors should be arranged so that any monitor may be substantially instantaneously replaced to correct faulty operation, so as to avoid breakdown in the efficiency of plant surveillance.

*Description of the prior art*

In the past, an accumulation of various television monitors has been made haphazardly at stations where the monitors are to be viewed. The monitors normally have been placed in a single line on a shelf-like support or they have been piled one upon another on desks and the like without regard to compactness and regularity of arrangement, and without regard to the ability to gain access instantly to any particular receiver for repairs or replacement.

SUMMARY OF THE INVENTION

Objectives of the invention include providing a modular stand, rack, shelf or housing support structure in which a plurality of television receivers may be individually and instantly removably mounted and supported in a compact arrangement such as in one, two, three or four rows, one on top of another, with two or more receivers in each row; providing a modular structure which may be modified so that the general center of a group of monitors supported and housed thereby may be conveniently located at the normal eye level of the individual or guard watching the group of monitors; providing a modular rack or housing structure whose components may be supplemented in number or changed in length so as to accommodate a different number of horizontal and vertical rows of compactly supported and housed television receivers; providing a modular rack or housing structure having for each monitor a pocket or pigeon hole or front opening box, in which a movable support shell for each television monitor is removably received, whereby any monitor may be instantly removed from its housed location for repair or replacement; providing a housing support structure in which power and TV cable connections for closed circuit television communication between the monitors and their respective cameras may be routed through the housing to a power supply panel and to closed circuit television cable connections; and providing a construction achieving the stated objectives simply, effectively, compactly and inexpensively, thereby solving problems and satisfying existing needs in the art.

These objectives and advantages are obtained by the stand, rack, shelf or housing support structures, the general nature of which may be stated as including, stand means including leg assemblies and shelf means forming a chamber extending between the leg means and selectively mounted at different heights on the leg means; end and similar intermediate partition support means mounted on and extending upward from the shelf means; top and back means forming with said partition means a housing; spaced shelf members extending at various levels one above another between each pair of adjacent partition means forming a series of pigeon hole front opening boxes in horizontal and vertical rows; a monitor shell removably supported on each shelf member in each pigeon hole; a monitor releasably supported in each shell; the pigeon holes having communication within the housing with each other and with said shelf chamber; and power supply receptacle means in said chamber for releasable plug-in connection with each monitor; whereby any monitor may be removed quickly for repair or replacement.

BRIEF DESCRIPTION OF THE DRAWINGS

Preferred embodiments of the invention—illustrative of the best modes in which applicant has contemplated applying the principles—are set forth in the following description and shown in the drawings, and are particularly and distinctly pointed out and set forth in the appended claims.

Similar numerals refer to similar parts throughout the drawings.

DESCRIPTION OF THE PREFERRED EMBODIMENT

Figures 1, 5:
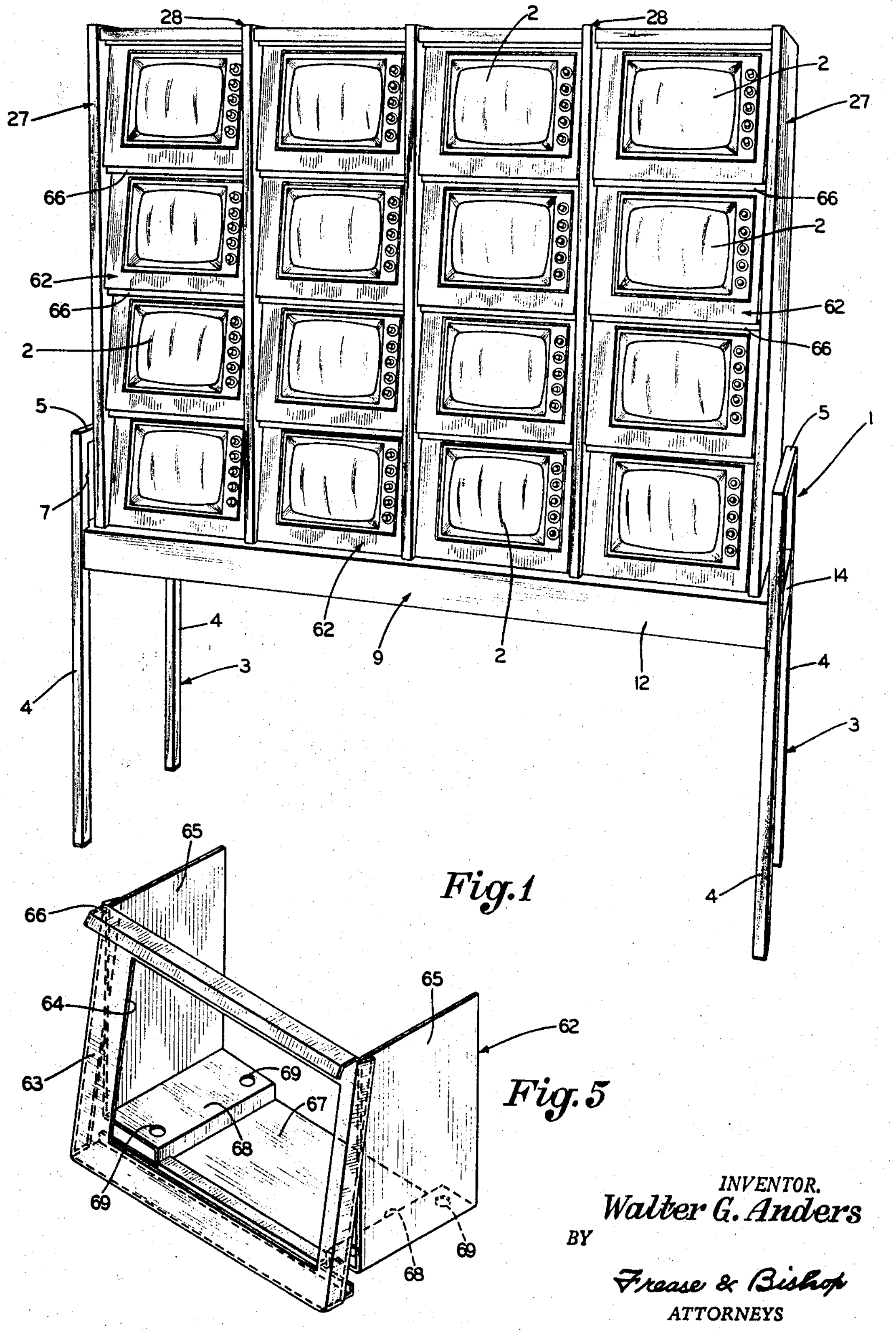
FIGURE 1 of the drawings is a perspective view of the new modular housing and stand construction adapted for compactly supporting four horizontal and vertical rows of television monitors.
FIG. 5 is a perspective view of a monitor shell used to removably support a monitor in its box or pigeon hole.
Figures 2, 3:
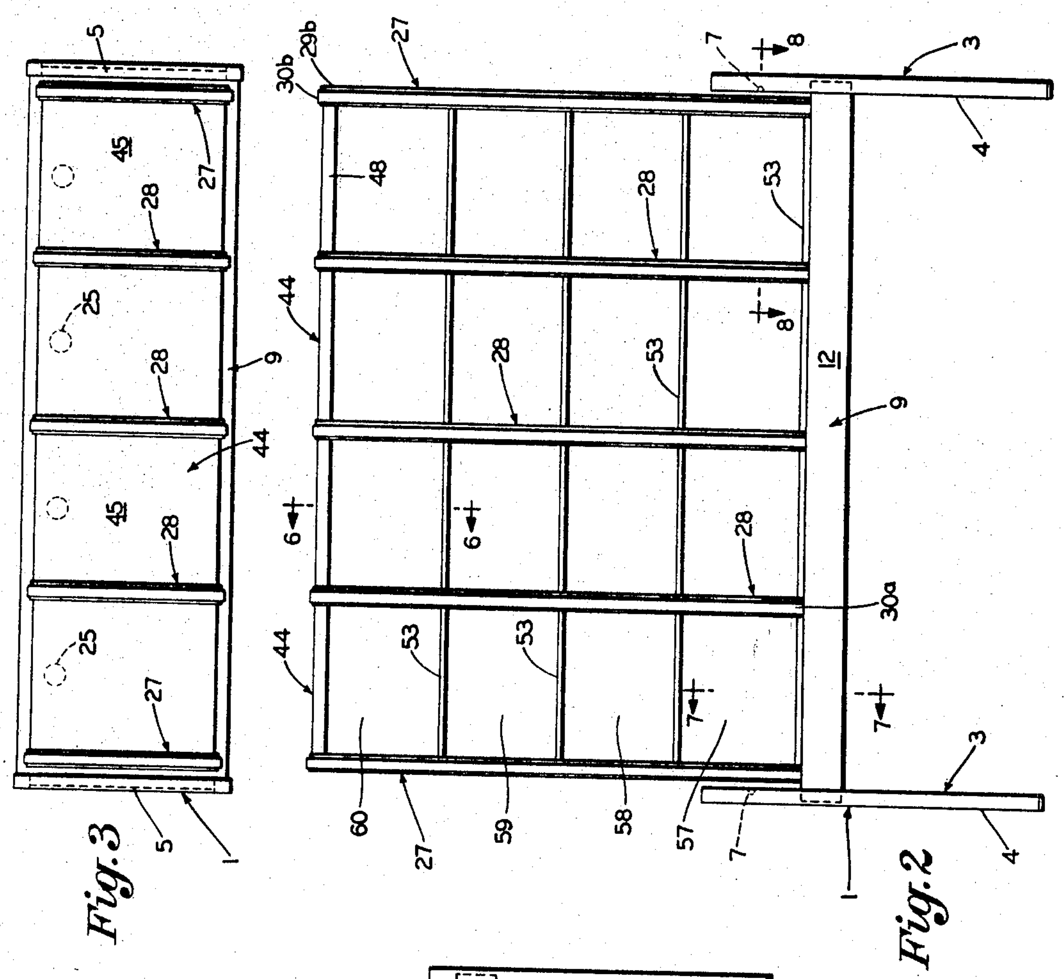
FIG. 2 is a front elevation view of the stand or housing structure shown in FIG. 1 with the television monitors removed.
FIG. 3 is a top plan view of the structure illustrated in FIGS. 1 and 2.
Figure 4:
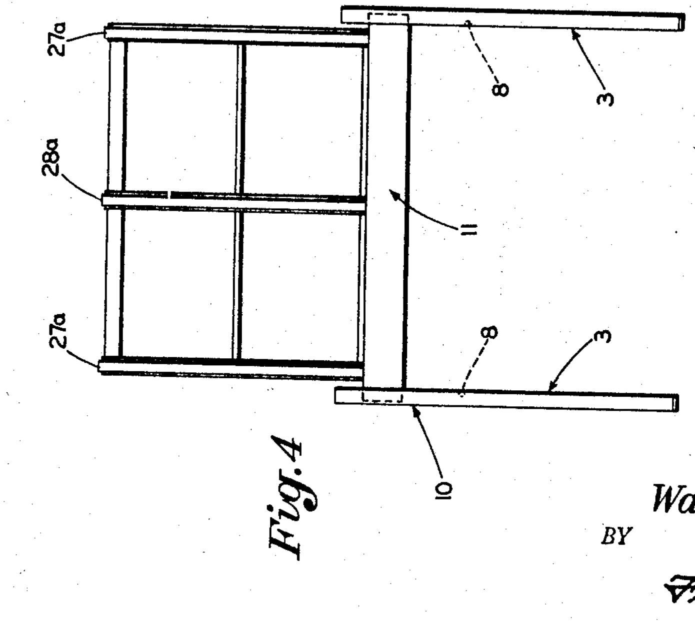
FIG. 4 is a view similar to FIG. 2 of the modular stand structure composed of structural elements adapted for housing two horizontal and vertical rows of television monitors.

A modular stand or housing unit is indicated generally at 1 in FIGS. 1, 2 and 3 and is adapted for supporting and housing four horizontal and four vertical rows of television monitors indicated generally at 2. The stand or housing structure includes preferably tubular U-shaped leg assemblies 3 at either end having upright leg members 4 and a leg top member 5. A leg bolt strap member 6 (FIG. 8) is inserted in the upper ends of each vertical leg member 4. Each upright leg member 4 is formed with an upper notch 7 in its inner corner (FIGS. 2, 7, 8 and 9) and a lower notch 8 (FIGS. 4 and 10) for the selective mounting of a shelf member 9 of the support structure on the leg assemblies 3. Ordinarily when more than two horizontal rows of monitors 2 are to be supported on the improved housing structure, the shelf member 9 is mounted on the leg assemblies 3 at the lower set of leg notches 8 (FIG. 1); and when one or two rows of monitors 2 are to be supported on a modified form of stand unit 10 such as illustrated in FIG. 4, the shelf member 11 for the unit 10 is supported on the leg assemblies 3 at the upper set of notches 7.

Shelf members 9 and 11 are identical in fundamental structure excepting that shelf member 9 is longer than shelf member 11 to accommodate an increased number of vertical rows of monitors.

Figures 7, 12, 13, 14:
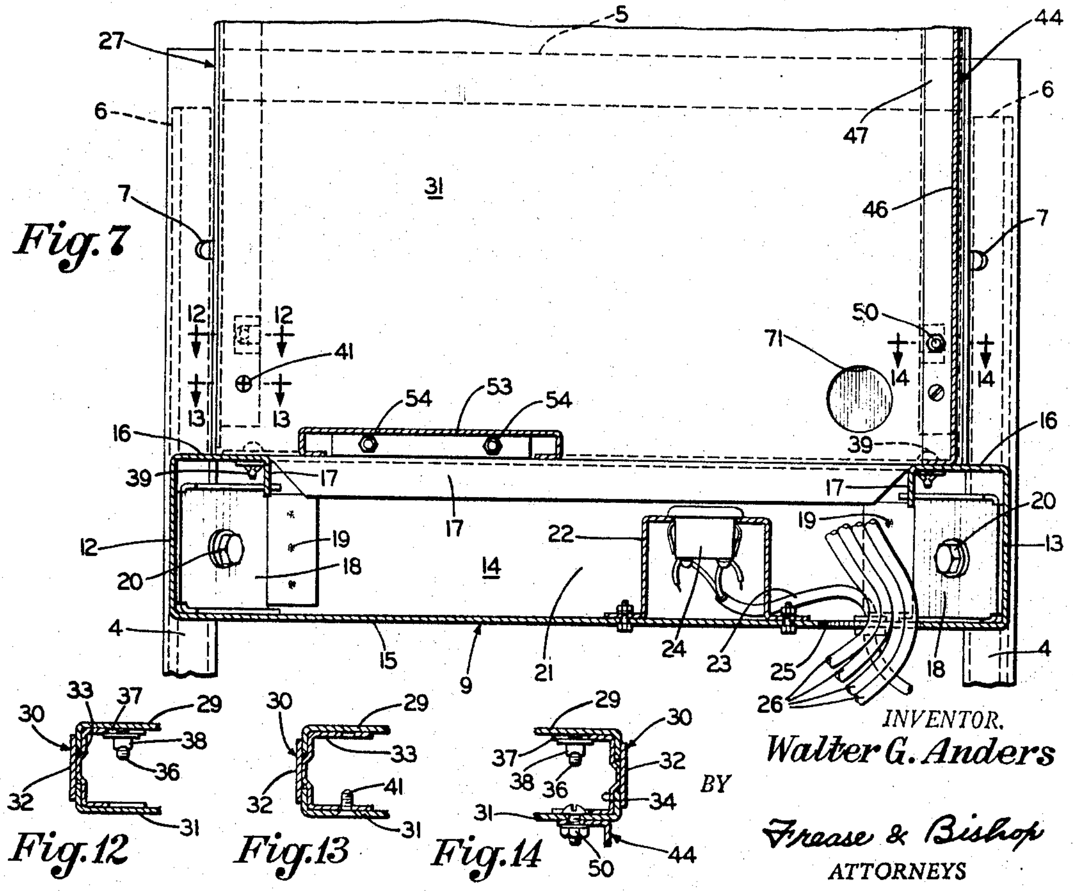
FIG. 7 is a similar sectional view taken on the line 7—7, FIG. 2.
FIG. 12 is a fragmentary section taken on the line 12—12, FIG. 7.
FIG. 13 is a similar sectional view taken on the line 13—13, FIG. 7.
FIG. 14 is a fragmentary sectional view looking in the direction of the arrows 14—14, FIG. 7.

Shelf member 9 (FIGS. 7, 8, 9 and 10) is generally inverted channel shape in cross section, with upright front and rear flanges 12 and 13 and end flanges 14 extending from the edges and ends of the lower channel wall 15. Upright flanges 12, 13 and 14 each terminates at its upper end in a horziontally disposed inturned flange 16 which in turn terminate in downturned flanges 17 (FIG. 7). Diagonal strap members 18 preferably are welded at 19 to flanges 12, 13 and 14 at each corner (FIGS. 7, 9 and 10) to reinforce the corner and to provide for bolted connection 20 between each corner strap member 18 and the leg bolt strap 6 in the upper portion of each upright leg member 4. The bolts 20 extend through the leg notches 7 or 8 depending upon the desired level of a shelf member 9 or 11. In this manner, a rigid stand structure is formed for the unit 1 or 10 by the leg assemblies 3 and shelf member 9 or 11.

The inverted channel arrangement of shelf member 9 provides a chamber or pocket 21 extending throughout the length of shelf member 9 below the level of shelf flanges 16 (FIG. 7). Chamber 21 provides a location for mounting a power panel 22 extending the length of the shelf member 9 which may be supplied with power through conductors 23 leading to a series of electrical receptacles 24, one for each of the monitors to be mounted on support unit 1.

Thus, where four monitors are mounted in each vertical row, one above the other, as illustrated in FIGS. 1, 2 and 3, four receptacles 24 (FIG. 8) are located in chamber 21 of shelf 9 immediately below each vertical row of monitors. The lower shelf wall 15 also is provided with an opening 25 below each vertical row of monitors. The power conductors 23 may enter the shelf chamber 21 through one opening 25. Closed circuit television cables 26, one for each monitor in a vertical row, also may enter the shelf chamber 21 through the openings 25.

A series of partitions and shelf brackets are mounted on the shelf member 9 in order to form compartments or pigeon hole boxes for receiving and supporting the monitors 2. The modular construction comprehended by the present invention, uses shelf brackets that are all the same, and the partition means are composed of the same basic components either as end partition support members or as intermediate partition support members. The number of vertical rows of monitors to be supported and housed determines the number of intermediate partition support members used. The number of horizontal rows of monitors to be supported and housed determines the height or vertical dimension of the partition support members.

Figure 15:
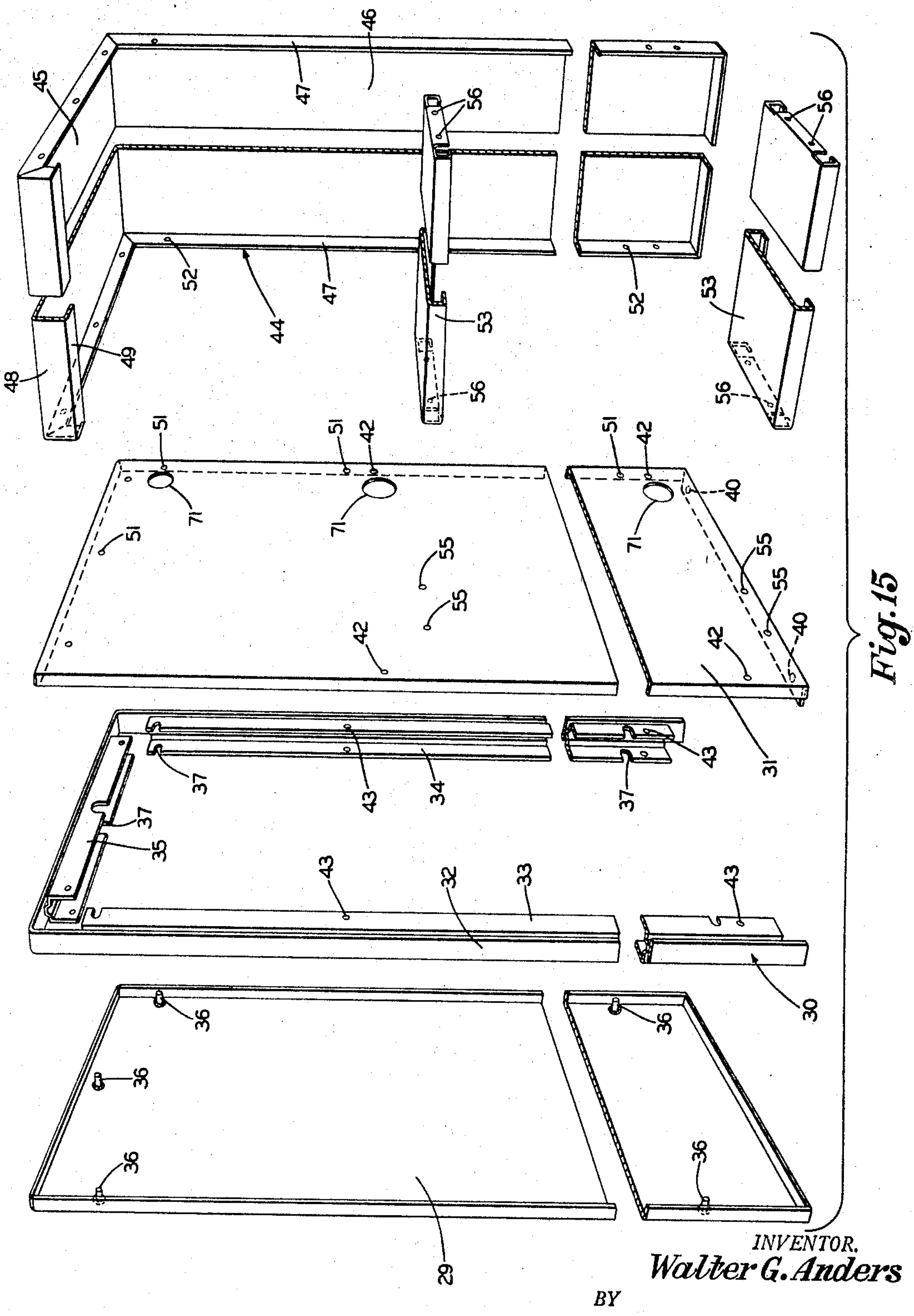
FIG. 15 is an exploded perspective view with parts broken away illustrating certain features of the modular stand and housing construction.

Referring particularly to FIGS. 1, 2, 3, 6, 7, 8 and 15, an end partition support assembly is indiacted generally at 27 and an intermediate partition support assembly is indicated generally at 28. The end partition support assembly 27 at the left-hand end of shelf member 9 (FIGS. 1, 2 and 15) is composed of an end panel 29, a trim assembly 30 and an inner panel 31. The inner panel 31 illustrated in FIG. 15 is a left-hand panel, and these panels 31 are made either left hand or right hand for the various partition assemblies.

Figure 8:
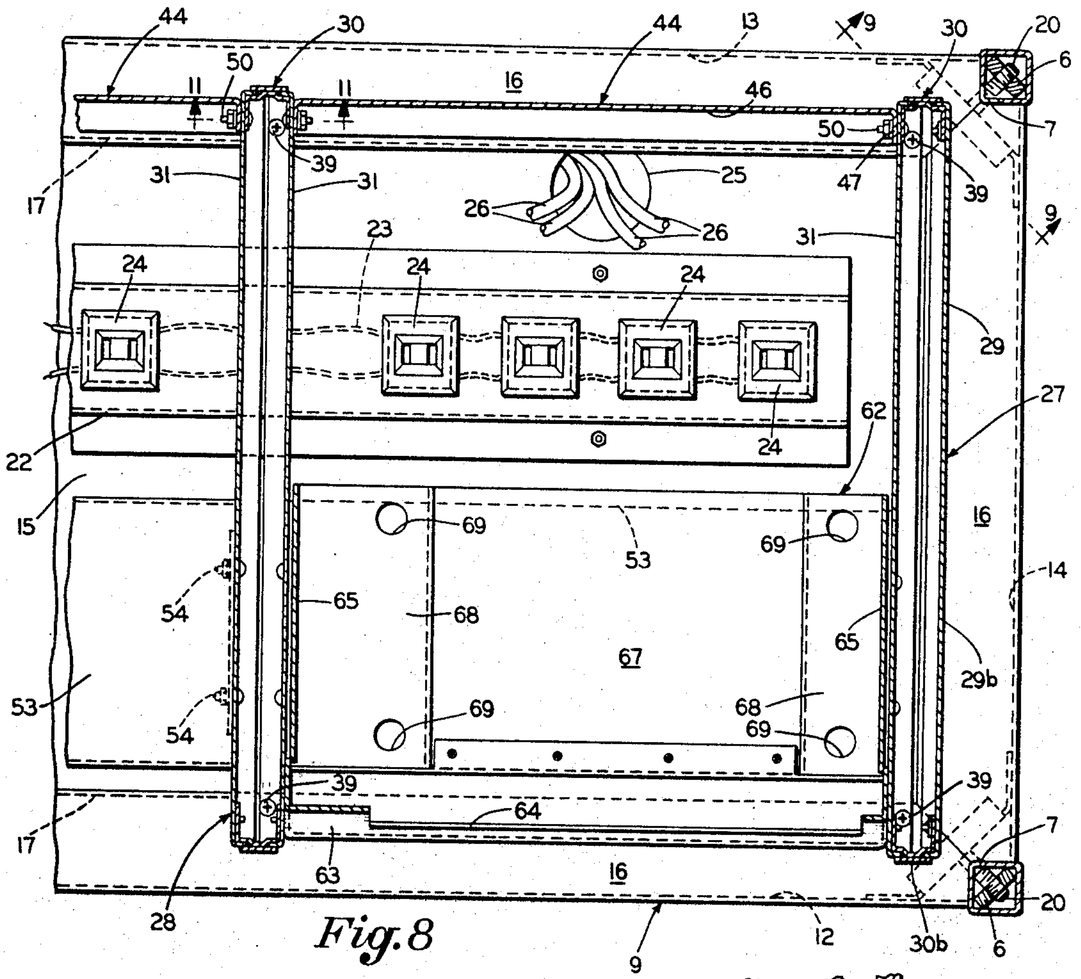
FIG. 8 is a fragmentary sectional view looking in the direction of the arrows 8—8, FIG. 2.

The end partition support assembly 27 at the right-hand end of shelf member 9 in FIGS. 2 and 8 is formed by an end panel 29, a trim assembly 30 and a right-hand inner panel 31. Each trim assembly 30 preferably comprises a U-shaped trim strip 32 (FIG. 15) and attaching channel members 33 and 34 secured to the side legs of the strip 32 and a similar attaching channel member 35 secured to the top bar portion of U-shaped trim strip 32. Bolts 36 are secured to each end panel 29 along the sides and at the top thereof projecting inwardly of the panel. These bolts are received in slotted openings 37 in the flanges of channels 33, 34 and 35 of trim assembly 30 (FIGS. 7, 12 and 14) and are held in place by clip nuts 38.

Meanwhile, inner panel 31 is secured to flanges 16 of shelf member 9 by clip nut held bolts 39 received in openings 40 in the bottom flange of inner panel 31 (FIGS. 7, 8 and 15). After inner panel 31 has been secured to shelf member 9, the end partition assembly 27 of end panel 29 and trim assembly 30 with inner panel 31 is completed by screws 41 which are received in openings 42 in inner panel 31 and in openings 43 in channels 33 and 34 of trim assemblies 30 (FIGS. 7, 13 and 15).

An L-shaped rear cover member generally indicated at 44 (FIG. 15) provides a top wall 45 and a back wall 46 extending between an end partition assembly 27 and an intermediate partition assembly 28. Similar cover members 44 extend between adjacent intermediate partition assemblies 28. The side edges of each rear cover 44 are formed with inturned flanges 47 and the front edge of top wall 45 is formed with a downturned flange 48 and an inturned flange 49.

Figures 9, 10, 11:
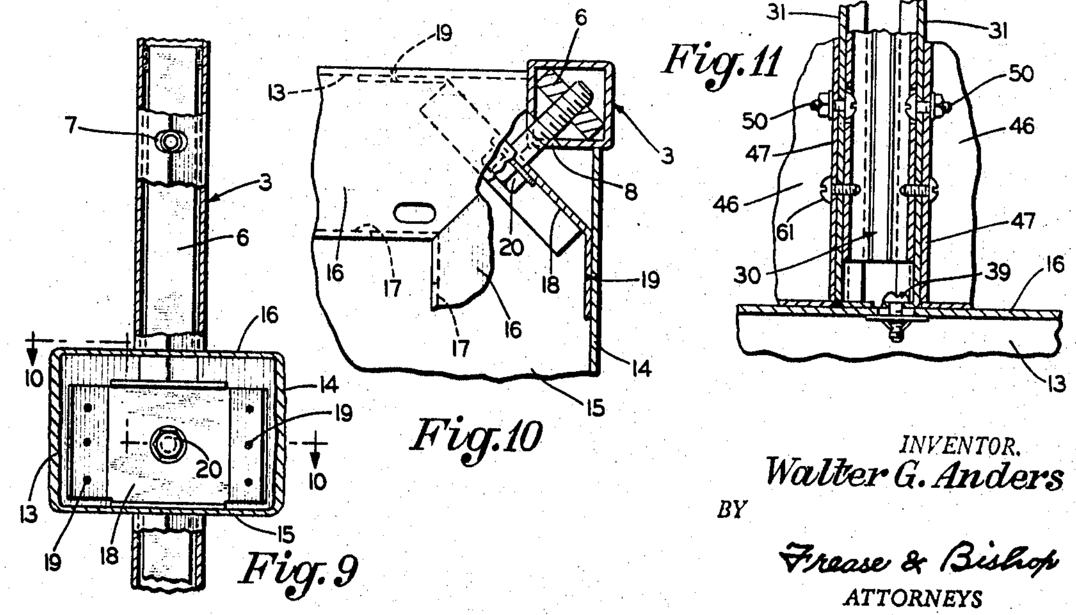
FIG. 9 is a fragmentary sectional view looking in the direction of the arrows 9—9, FIG. 8.
FIG. 10 is a fragmentary view of a rear corner of a stand taken on the line 10—10, FIG. 9.
FIG. 11 is a fragmentary sectional view looking in the direction of the arrows 11—11, FIG. 8.

Preferably, before an inner panel 31 is secured to shelf member 9, a subassembly is formed of a rear cover 44, a left-hand inner panel 31 and a similar right-hand inner panel 31, by securing flanges 47 of rear cover 44 by bolts 50 connected in openings 51 in a left-hand inner panel 31 and openings 52 in left-hand flange 47 of rear cover 44 (FIGS. 7, 14 and 15), and similarly securing right-hand flange 47 at the right hand of rear cover 44 to a right-hand inner panel 31 (FIGS. 8 and 11).

A subassembly of a rear cover 44 with a left-hand inner panel 31 and a right-hand inner panel 31 bolted thereto then is mounted on the shelf member 9 by bolts 39 secured through openings 40 in the lower flanges of members 31 to inturned flanges 16 of shelf members 9. Then the subassembly of end panel 29 and a trim assembly 30 is secured by the screws 41 to the left-hand inner panel 31 at the left-hand end of the structure shown in FIG. 2.

Figure 6:
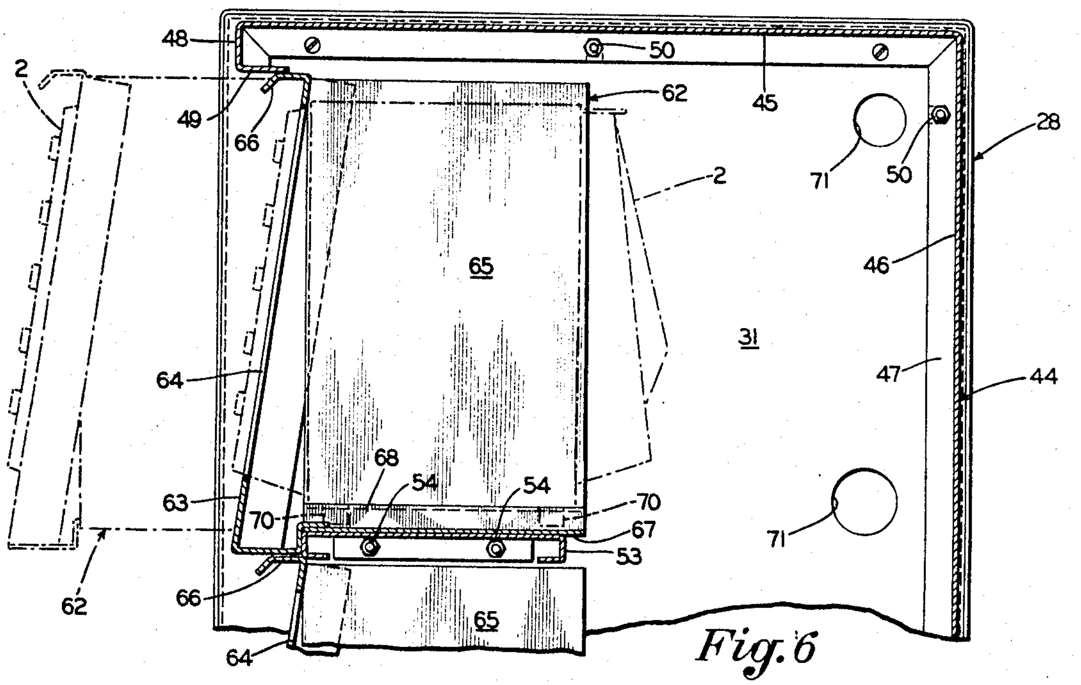
FIG. 6 is an enlarged fragmentary sectional view taken on the line 6—6, FIG. 2.

Meanwhile, a series of monitor rails or shelf brackets 53 is mounted, one spaced above another, on the inner panels 31 by bolts 54 connecting rails 53 to the inner panels 31 through bolt apertures 55 and 56 (FIGS. 6, 7 and 15). The rear edges of brackets 53 are spaced forwardly from the back wall 46 of cover 44 to provide communication within the housing with all parts of the housing and the shelf chamber 21.

In this manner, a series of pigeon hole boxes or compartments indicated at 57, 58, 59 and 60 in FIG. 2 is formed in a vertical row by the modular assembly structure described. Another trim assembly 30 is then secured at the location indicated at 30*a* in FIG. 2 to the right-hand inner panel 31 of the subassembly of two panels 31 and a cover 44 just described. This is accomplished in the manner described for assembling the trim assembly 30 to an end panel 29, and bolts 61 illustrated in FIG. 11 are used for securing the right-hand inner panel 31 (FIG. 8) to a trim assembly 30.

The assembly of modular partition assemblies and trim assemblies and monitor rails may be continued from left to right (FIG. 2) until the right-hand end of portion of shelf member 9 is reached. The right-hand series of vertically arranged pigeon hole boxes are closed by a trim assembly 30*b* and an end panel 29*b* as illustrated in FIGS. 2, 3 and 8.

The final modular assembly of unit 1 as shown in FIG. 1 provides a series of pigeon hole boxes or compartments in horizontal and vertical rows for receiving television monitors 2 in a compact arrangement.

A monitor shell 62 (FIG. 5) is used to support each monitor 2, and shell 62 includes a front frame member 63 having an opening 64 formed therein through which the picture tube of a monitor 2 is visible. Shell 62 also has side walls 65, a top handle flange 66 and a base wall 67 having raised portions 68 formed with monitor locator openings 69. A television monitor 2 may be supported in the monitor shell 62 with the monitor feet 70 engaged in the locator openings 69 in raised shell portions 68. A shell 62 with a TV monitor 2 supported therein may be held by its base wall 67 and the top handle flange 66 and moved into or out of any of the pigeon hole boxes on one of the monitor rail or shelf brackets 63 as illustrated in dot-dash lines in FIG. 6.

Each monitor 2 may have plug-in power connection with one of the electrical receptacles 24. Similarly the TV cable for the monitor 2 may have plug-in connection with one of the closed circuit television cables 26 connected with the particular camera serving the particular monitor.

The inner panels 31 may be formed with a series of openings 71 at various levels for routing power supply conductors or television cables from the housing portion in one vertical row of monitors to the laterally adjacent housing portion.

*Second embodiment*

The modified structure in FIG. 4 does not depart from the basic structure shown in FIG. 2 excepting for the location of the shelf member 11 on leg assemblies 3, the length of the shelf member 11 and the height and number of partition assemblies 27*a* and 28*a*. Thus, the modular construction permits any number of horizontal and vertical rows of pigeon hole receptacles for monitors to be formed in the monitor housing and stand.

*Operation and use of the modular TV monitor housing and stand*

A housing and stand unit such as units 1 or 10 of the desired size and supporting and housing the required number of monitors 2 of standard construction may be located in the guard room at the gate or entrance of an industrial plant. The various monitors 2 housed in the unit are individually connected by closed circuit television cables 26 with cameras located at various stations in and around the industrial plant. Television pictures are transmitted from the cameras to the monitors. A single guard at the guard station may conveniently watch all the pictures projected from the compactly housed group of monitors for detecting some unusual event occurring and pictured by any one of the monitors.

The housing and support stand or unit locates the group of monitors with the center of the group arranged approximately at the eye level of guard who maintains the security surveillance. Thus, no strain is imposed on the guard maintaining the watch.

The improved housing and stand structure is very simple and compact in construction, easy to use, and inexpensive since it incorporates a modular arrangement which may be readily changed by merely changing the sizes of certain components to support and house any reasonable number of television monitors. At the same time any housed monitor may be removed instantly for repair or replacement and thus the improved construction enables efficient plant surveillance to be maintained.

The improved construction, accordingly, provides an effective and inexpensive housing and stand structure for compactly supporting a large number of television monitors, and achieves the described objectives and solves needs existing in the art in a simple and inexpensive manner.

In the foregoing description certain terms have been used for brevity, clearness and understanding; but no unnecessary limitations are to be implied therefrom beyond the requirements of the prior art because such terms are used for descriptive purposes and are to be broadly construed.

Moreover, the description and illustration of the invention is by way of example, and the scope of the invention is not limited to the exact terms, or to the particular number of monitors that are supported and housed, which are shown and described.

Having now described the features, discoveries and principles of the invention, the manner in which the improved construction is made, assembled and used, and the characteristics of the new construction, the advantageous, new and useful structures, devices, elements, arrangements, parts and combinations, and mechanical equivalents obvious to those skilled in the art.

I claim:

1. Modular television monitor housing and stand construction including leg means, shelf means mounted on the leg means having walls forming a chamber extending between the leg means, means selectively mounting the shelf means at different elevations on the leg means; partition support means mounted at spaced intervals on and extending upward from the shelf means; cover means having top and back walls extending between each pair of adjacent partition means and forming with said partition means a housing; spaced shelf members located at different levels one above another between and connected to each pair of adjacent partition means; said partition means, cover means and shelf members forming a series of pigeon hole boxes in horizontal and vertical rows in said housing; a monitor shell removably supported on each shelf member in each box; said monitor shell having monitor locator means adapted to engage, releasably hold and support a television monitor in the box in which the shell is located; the shelf members each having a rear edge spaced forwardly from the back wall of the cover member to provide communication within the housing between each box and the shelf means chamber; and power supply receptacle means in the chamber for releasable plug-in power connection with each monitor, whereby any monitor may be removed quickly for repair or replacement.

2. The construction defined in claim 1 in which the leg means includes upright leg members, in which upper and lower notches are formed in the leg members, and in which the shelf means is mounted on the leg members selectively at the upper or lower notches.

3. The construction defined in claim 1 in which the shelf means comprises a member having inverted channel shape with a lower channel wall, upwardly extending side flanges and inturned flanges at the upper edges of the side flanges forming the shelf chamber, and in which the partition support means mounted on the shelf means rest upon and are connected to said inturned flanges.

4. The construction defined in claim 3 in which the power supply receptacle means in the shelf chamber comprises a power panel and electrical receptacles carried by the panel, in which the shelf means lower channel wall has ends, and in which the power panel is mounted on said lower channel wall extending between the ends thereof.

5. The construction defined in claim 1 in which each partition support means comprises an assembly of two panels and trim means located between and connected to the panels.

6. The construction defined in claim 5 in which the trim means comprises a U-shaped trim strip, and attaching channels secured to the trim strip; and in which each of the two panels is secured to said attaching channels.

7. The construction defined in claim 5 in which at least one of the partition support means panels has a bottom flange, and in which said bottom flange is bolted to said shelf means.

8. The construction defined in claim 1 in which the top and back walls of the cover means have ends terminating in inturned flanges, and in which said inturned flanges are bolted to the adjacent partition means between which the cover means extends.

9. The construction defined in claim 1 in which each monitor shell comprises a front frame member formed with a front opening, side walls, a top handle flange, and a base wall; and in which the monitor locator means is formed in said base wall.

10. The construction defined in claim 9 in which the monitor shell base wall has raised portions; and in which openings are formed in said raised portions to form the monitor locator means adapted to receive the feet of a monitor supported in the shell.

References Cited

UNITED STATES PATENTS

| | | | |
|---|---|---|---|
| 2,831,745 | 4/1958 | Parmet | 312—257 |
| 3,056,639 | 10/1962 | Caminker et al. | 312—257 |

CASMIR A. NUNBERG, *Primary Examiner.*

V. L. KOHNEN, *Assistant Examiner.*

U.S. Cl. X.R.

211—26; 312—198